G. L. STARK & A. W. BAXTER.
SKEWER.
APPLICATION FILED AUG. 11, 1909.
974,200.
Patented Nov. 1, 1910.
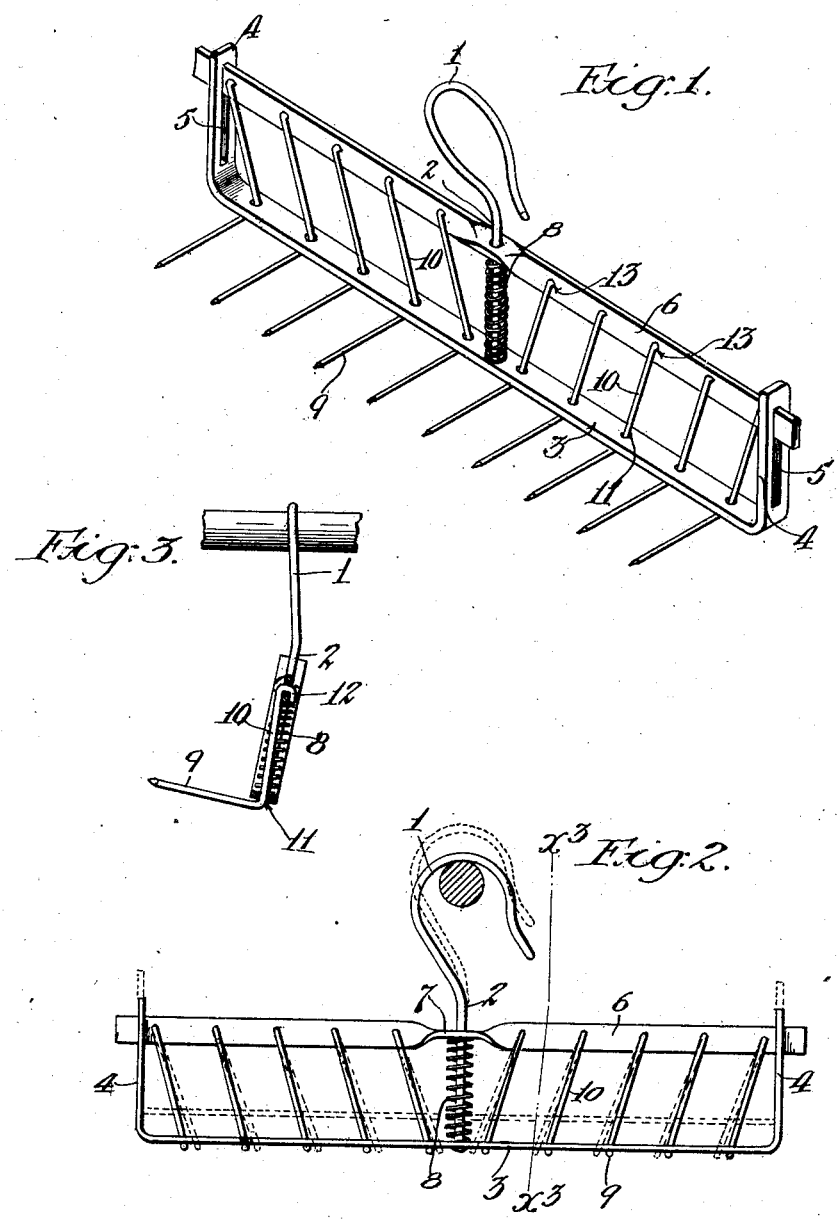
Witnesses:-
Inventors,
George L. Stark
Albert W. Baxter,

UNITED STATES PATENT OFFICE.

GEORGE L. STARK AND ALBERT W. BAXTER, OF LOS ANGELES, CALIFORNIA.

SKEWER.

974,200.  Specification of Letters Patent.  Patented Nov. 1, 1910.

Application filed August 11, 1909. Serial No. 512,402.

*To all whom it may concern:*

Be it known that we, GEORGE L. STARK and ALBERT W. BAXTER, both citizens of the United States, residing at Los Angeles, in the county of Los Angeles and State of California, have invented a new and useful Skewer, of which the following is a specification.

This invention relates to skewers for hanging meat and particularly bellies of bacon when being cured, such a type of skewer being shown in a previous application of ours filed Oct. 28, 1908, Serial No. 459936.

The object of the present invention is to provide means for causing the teeth to automatically move toward each other to contract the spaces between the teeth as the meat shrinks in being cured, so that when cured the edge of the meat which was engaged by the skewer will not be stretched or wider than the rest of the meat.

Another object is to provide a skewer which may be more economically constructed.

Figure 1 is a perspective view of the complete skewer. Fig. 2 is a front elevation of the skewer. Fig. 3 is a section on line $x^3$—$x^3$ Fig. 2.

1 designates a supporting hook having a straight shank 2 which extends through and supports a frame 3, the latter comprising a horizontal bar with upturned ends 4. Each end 4 has a slot 5 and the ends of a tooth carrier 6 are slidably mounted in the slots 5. The tooth carrier 6 comprises a horizontal bar having a central portion 7 which is twisted at right angles to the main portion of the bar. The portion 7 has a perforation 8 through which the shank 2 of the hook 1 loosely passes. The tooth carrier 6 is thus capable of a vertical sliding movement with respect to the frame 3 and is guided in such vertical movement by slots 5 and bars 2. A coil spring 8 is arranged around the shank 2 between the frame 3 and tooth carrier 6. The spring 8 serves to hold the carrier 6 in its upper position.

A series of teeth 9 project transversely from the frame 3, each tooth 9 being bent substantially at right angles to form a shank 10 which occupies a substantial vertical plane. The frame 3 is provided with perforations 11 through which the shanks 10 loosely pass, the perforations 11 being somewhat larger than the shanks 10 for a reason to be explained. The upper ends of the shanks 10 are formed as hooks 12 which extend through perforations 13 in the tooth carrier 6. The shank 2 of each hook 1 is bent slightly so that when the skewer is suspended as shown in Fig. 3 the frame 3 will stand at a slight angle to the vertical and the teeth 9 will be upwardly slanted somewhat. The perforations 13 in the tooth carrier 6 are spaced apart the same distance as the perforations 11 in the frame 3 and the perforations 13 are arranged out of line with the perforations 11 as clearly shown in Fig. 2 so that all of the shanks 10 on each side of the hook slant outwardly, and it will be obvious that if the tooth carrier 6 is moved down with respect to the frame 3 that the angles of the shanks 10 will be increased and that the spaces between the teeth will be decreased an amount corresponding to the movement of the tooth carrier 6. This swinging action of the shanks 10 is permitted by the enlarged perforations 11 so that the shanks 10 do not bind therein.

The meat to be cured is pressed onto the teeth 9 and hangs down from the skewer and the weight of the meat pulling on the tooth carrier 6 will move the latter down somewhat, but will not at first move it clear down for the reason that the teeth must be permitted to come close together as the tooth carrier descends and before the meat is cured the meat between the teeth 9 is moist and unshrunk so that it interposes a resistance to prevent the teeth moving toward each other and in this way the tooth carrier 6 and teeth 9 are prevented from moving down when the meat is first attached. As the meat dries it shrinks so that the resistance of the portions of meat which are between the teeth 9 decreases which permits the teeth to move closer together, while the weight of the meat which constantly exerts a downward pressure on the tooth carrier 6, causes the carrier 6 to move down at a rate of speed corresponding to the rate at which the meat dries. It is also apparent that as the tooth carrier more closely approaches the frame 3 the teeth 9 will be moved farther away from the frame 3 so that the teeth will be capable of a greater degree of swinging movement at the perforations 11.

In the previous application of ours above referred to, the teeth were moved closer to each other as the meat cured, but such movement was produced by the contraction of the meat in drying. In the present case it is the weight of the meat and not its contraction which causes the teeth to be moved closer together. This contracting movement of the teeth is retarded to a certain rate by the meat interposed between the teeth. In the first case there was a tendency to elongate the holes through which the teeth pass, while in the present case this elongation of the holes in the meat is obviated by the automatic contraction of the teeth produced by the weight of the meat acting through the mechanism of the skewer.

What we claim is:

1. A skewer comprising a frame, a tooth carrier movable vertically on the frame, and a series of teeth connected with the tooth carrier, said frame having individual means for guiding the respective teeth of the series.

2. A skewer comprising a frame, a series of teeth, means for supporting said teeth, and means operated by the weight of the meat on the teeth for moving the teeth closer together.

3. A skewer comprising a frame, a tooth carrier movable vertically on the frame, teeth connected with the tooth carrier, the frame having perforations through which the teeth extend, said perforations being located out of line with the point of connections between the teeth and tooth carrier.

4. A skewer comprising a frame consisting of a horizontal bar with upturned ends, said ends having slots, a tooth carrier comprising a horizontal bar with ends extending through said slots, a hook with a shank supporting said frame, said shank passing loosely through said tooth carrier, means for yieldingly holding the tooth carrier in the upper part of said slots, and teeth pivotally connected to the tooth carrier and extending through perforations in the frame out of line with their pivotal connections at the tooth carrier.

5. A skewer comprising a frame consisting of a horizontal bar with upturned ends, said ends having slots, a tooth carrier comprising a horizontal bar, the ends of which extend into said slots, a hook with a shank supporting said frame, said shank passing loosely through said tooth carrier, means for yieldingly holding the tooth carrier in the upper part of said slots, and teeth pivotally connected to the tooth carrier and extending through perforations in the frame out of line with their pivotal connections at the tooth carrier, the perforations in the frame through which the teeth pass being somewhat larger than the teeth.

In testimony whereof, we have hereunto set our hands at Los Angeles, California, this 28th day of July 1909.

GEORGE L. STARK.
ALBERT W. BAXTER.

In the presence of—
P. H. SHELTON,
FRANK L. A. GRAHAM.